June 6, 1944. E. CITO 2,350,387
WELDING ROD OR ELECTRODE
Filed Feb. 7, 1941 2 Sheets-Sheet 1
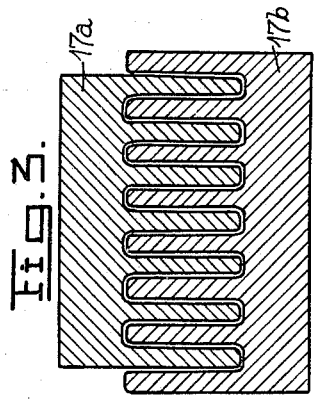
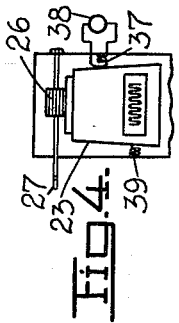
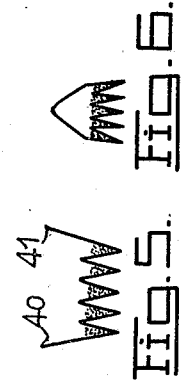
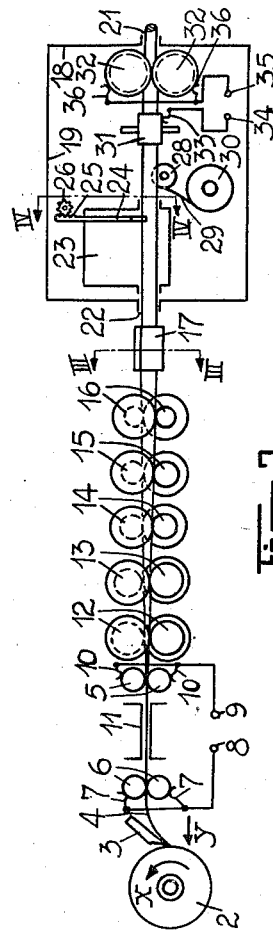
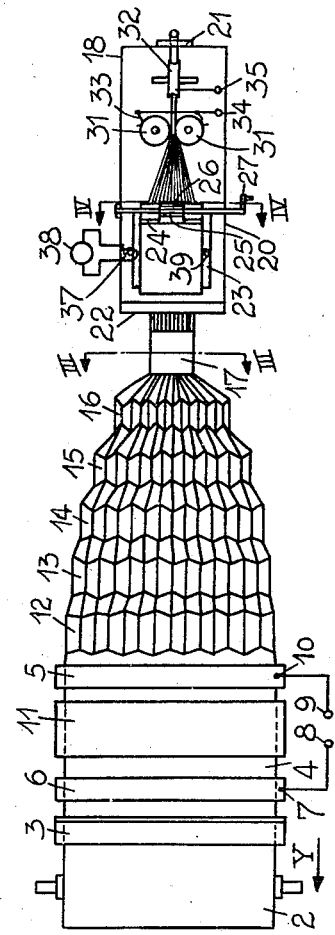
INVENTOR
C. CITO
BY
Young, Emery & Thompson
ATTYS.

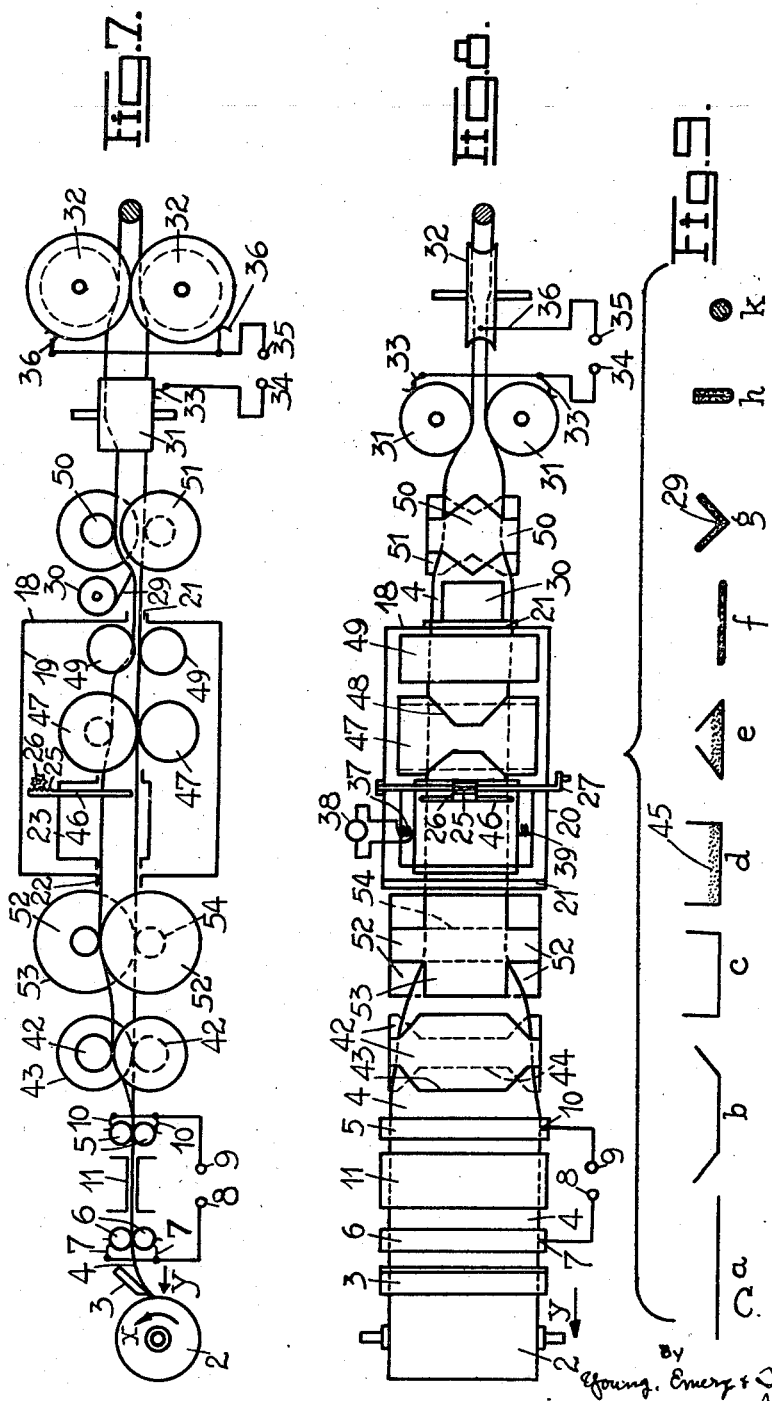

Patented June 6, 1944

2,350,387

UNITED STATES PATENT OFFICE 2,350,387

WELDING ROD OR ELECTRODE

Camillo Cito, Uccle-Brussels, Belgium; vested in the Alien Property Custodian

Application February 7, 1941, Serial No. 377,905
In Belgium January 26, 1940

4 Claims. (Cl. 219—8)

The present invention relates to a welding rod and in particular to an electric arc welding electrode having additions arranged between a number of metallic elements running parallel to the axis of the rod.

Welding electrodes of this kind are known which are made up of wires obtained by rolling and by drawing and twisted together, the spaces between the wires being filled with addition substances.

These rods have the disadvantage that they are expensive to manufacture because the elementary wires of which they are made have had to be manufactured by rolling and drawing and the smaller they are, the more expensive they are. Moreover, these wires contain numerous small gas pockets which, when the end of the rod is heated, explode and, consequently, cause a violent projection of the surrounding metal. Finally, the addition substances are in contact with each other. Therefore, they can deteriorate when the rods are stored.

Welding rods of the above-mentioned kind are also known which are made up by agglomerating long metal fibres of small cross section which extend approximately parallel to the axis of the rod, addition substances being arranged between the fibres.

These rods do not have the disadvantage of having a large number of gas pockets between the fibres of which they are made up, but their electrical conductivity, although quite satisfactory, is not as perfect as that of a rod made up of elements which extend without discontinuity from one end of the rod to the other. Furthermore, the addition substances which are arranged between the fibres can react on each other when the rods are stored.

One object of the invention is to provide a welding rod in which these disadvantages are not present.

To this end, in the rod in accordance with the invention, the above-mentioned additions are arranged in channels which are isolated from each other and are bounded by the faces of the folds of a thin strip.

Preferably, these channels are also isolated from the outside. The isolation can be assured by a fluid-tight sheath which may advantageously contain substances which contribute to the production of a good deposited metal. It can also be ensured by welding to each other at the periphery the faces of the formed folds.

The use of a thin strip has the advantage of considerably reducing the thickness of the walls of any gas pockets which it may contain.

Consequently, these pockets can explode at a lower pressure and they only give rise to a mild projection of metal. The use of thin wires having a diameter near that of the thickness of the strip used in accordance with the invention would not be possible in practice because of the high manufacturing cost of such wires. Moreover, the rods formed by such wires would be too flexible to be used normally for welding operations.

In one useful embodiment, the addition substances are maintained in a dry condition by being squeezed between the faces of the formed folds of the strip.

The strip from which the welding rod in accordance with the invention is formed, is preferably a thin strip which has been cut out by means of tools from metal blanks of fairly great thickness relatively to the thickness of the strip to be obtained. In this case, the cutting out causes a large number of small pockets which may exist in the blank from which the strip is made to be opened.

Another object of the invention is the method of manufacturing of a welding rod and in particular of an electrode for electric arc welding.

In the method in accordance with the invention, a strip is folded longitudinally, addition substances are introduced between the faces of the formed folds, and the addition substances are held in place by tightening these faces against each other.

In order to ensure the precisely exact quantity of addition substances where these are in the form of powder or of other small particles, the folds are gauged before the additions are introduced into them and the height of the layer of additions between the faces or the formed folds is adjusted before the substances are squeezed between these faces.

Other features and details of the invention will become apparent in the course of the description of the drawings attached to the present specification and which show diagrammatically and merely by way of example two installations for making a welding rod in accordance with the invention and the changes in cross-section of this rod which take place during the different phases of the method in accordance with the invention.

Figure 1 is an elevation of one of these installations,

Figure 2 is a plan view of the installation shown in Figure 1,

Figure 3 is a section on the line III—III in Figures 1 and 2, drawn to a larger scale, Figure 4 is a vertical section taken on the line IV—IV in Figures 1 and 2, Figures 5 and 6 are diagrammatic representations of the cross-section of a welding rod at two phases of a variant of the process which is used with the installation shown in Figures 1 to 4, Figure 7 is an elevation of a second installation for making a welding rod in accordance with the invention, Figure 8 is a plan of the installation shown in Figure 7, Figure 9 is a diagrammatic representation of the changes in the cross-section of a welding rod which take place at different phases of the process used with the installation of Figures 7 and 8.

The same references have been used in the various figures to denote similar elements.

The installation in Figures 1 to 4 comprises a cylindrical piece 2 which turns in the direction of the arrow X in front of a tool 3 which advances radially in the direction of the arrow Y towards the axis of the piece 2 as and when a thin strip 4 is unwound from the latter.

This thin strip is rolled hot between rolling cylinders 5 so as to restore to it the elasticity which it may have lost while being cut out. The heating of the strip before it is rolled is effected, for example, by means of a Joule effect due to the fact that the strip, after being cut out, passes between rollers 6 connected by means of contact members 7 to one of the terminals 8 of a source of current, the other terminal 9 of which is connected through contact members 10 to the rolling cylinders 5. Between the rollers 6 and the cylinders 5, the strip passes through a hot chest 11 the object of which is to prevent its cooling.

After its passage between the rolling cylinders 5, the strip is folded longitudinally. To this end, it passes successively through pairs of shaping rollers designated 12, 13, 14, 15, and 16. The shaping rollers are provided with grooves of generally triangular shape. The face of the grooves in the different pairs all have the same width, but the angle which these faces make with each other varies from one pair of rollers to the next.

As can be readily seen from an inspection of Figure 2, the triangular grooves decrease in width as the distance of the rollers to which they belong from the point at which the folding of the strip starts, increases. The depth of the grooves obviously varies inversely proportionally to their width as the two faces of the grooves of all the shaping rollers have the same width.

By means of this special method of folding the strip, folds of constant length are obtained, and transverse drawing of the metal is avoided so that there is no danger of its being torn during the folding, even when the folding is carried out cold. When the folding is carried out in this manner, it is even possible with certain strips to dispense with the rolling of the strip after it has been cut out.

After it has left the last pair of shaping rollers 16, the folded strip passes through a die 17 (Figures 1 to 3) comprising two parts 17a and 17b between which the folding is gauged. When it leaves this die, the folded strip enters a casing 18, the top 19 (Figure 1) of which is assumed in Figure 2 to be removed and the side face 20 (Figure 2) of which is assumed in Figure 1 to be removed.

The various operations which are carried out in this casing are effected out of contact with the air and moisture. To this end, dry nitrogen can, for example, be introduced through an opening 21 situated at one of the ends of this casing, this nitrogen escaping through an opening 22 situated at the opposite end.

In the casing 18, there is a vessel 23 containing, for example, powdered ferro-chromium. The folded strip passes through this vessel. The ferro-chromium powder is introduced between the faces of the formed folds and the quantity of powder contained in each fold is regulated with precision by the height of the layer in each fold. This height is determined by the position of a comb 24 the teeth of which project between the faces formed by the folding and the level of which is adjustable. To this end, this comb is provided with a rack 25 meshing with a pinion 26 which can be turned from the outside of the casing 18 by means of a crank 27.

In order to facilitate the descent of the addition substances into the receptacle 23, provision is made for agitating these substances in the receptacle by subjecting the latter to vibrations created by an electromagnet 37 (Figures 1 to 4) fed from a source of alternating current 38 having an industrial frequency. The vessel 23 is also subjected to the action of a returning spring 39.

The descent of the added substances into the vessel 23 is also facilitated by the downwardly flaring shape of the part of this vessel which lies above the folded strip.

Addition substances can also be introduced into the channels formed by the faces of the folds at the lower part of the folded strip. These substances can be pressed in any desired manner between the faces of the folds, for example by means of rollers.

In Figures 1 and 2 there is shown a roller 28 (Figure 1) which forces a nickel wire 29 coming from a spool 30 between two of the faces of the folds into the lower part of the folded strip.

After the various additions have been introduced between the faces of the folds of the strip, these faces are aproached by causing the strip to pass between two rollers 31 the axis of which is at right angles to the mean plane of the folded strip. The passage of the strip between the rollers 31 has the effect of tightening the addition substances strongly between these faces.

Where powder is introduced only into the channels formed by the faces of the folds in the upper part of the folded strip, the folding can be advantageously effected in such a way that the plane passing through the free edges of the external face of the external folds does not meet any of the other faces of the folds. In this way, as is shown diagrammatically in Figure 5, folds are formed, the free edges 40 and 41 of the external faces of which are above the other faces of the folds. After various additions have been introduced, these edges are brought near to each other as indicated in Figure 6 so as to prevent the powder from escaping between the folded faces. The strip treated in this manner is then passed between the rollers 31 which, as indicated above, has the effect of tightening the faces of the folds on to each other.

The mass which is obtained at exit from the rollers 31 is rolled hot between the rolling cylinders 32 the profile of which corresponds to that of the desired electrode. The axis of these cylinders is at right angles to the plane of the faces in contact. The heating of the mass which is to be rolled hot is effected, for example, electrically by the Joule effect between the rollers 31 and the rolling cylinders 32. The rollers 31 are connected by means of contact members 33 to one of the terminals 34 of a source of current, the other terminal 35 of which is connected by means of contact members 36 to the rolling cylinders 32.

By having been passed hot through the rolling cylinders 32, the external parts of the folds are welded to each other and insulate the addition substances from the outside. These addition substances are maintained properly in place although at no time have they been in the form of a paste. Their incorporation in the electrode can be effected completely dry. The electrode which is thus obtained can leave the casing 19 through the opening 21 without there being any possibility of reaction between the various addition substances or between the latter and the outside. It is therefore possible to use as additions, substances which are hygroscopic or parts which are liable to oxidation.

In the electrode obtained in this manner, the additions are excellently distributed over the whole mass. The electrode contains very little occluded gas and therefore it gives rise to fewer projections during the welding than in the case of solid electrodes. The proper distribution of the additions throughout the mass allows alloys containing a high proportion of various metals to be obtained.

Furthermore, it is easy to ensure that the precisely exact quantity of the additions will be provided by the gauging of the folds of the strip and by regulating the height of the powder between the faces of the folds.

It is even possible to make quite easily an electrode in which the quantity of the additions varies from one cross section to another. For that purpose, it is only necessary to cause the height of the comb 24 to vary during the passage of the folded strip through the vessel 23.

An electrode of this kind is useful when, for example, a metal object having a given composition has to be covered with a layer of metal or of an alloy having a different composition. In this case, it may be advantageous to start the deposition of this layer by means of an electrode the composition of which is near that of the part to be covered and to continue the deposition by means of a metal the composition of which is more and more nearly that which one wishes to obtain at the outside of the covering layer.

It is also possible to make a welding rod in accordance with the invention by folding the strip in a different way from that indicated above. Thus, in the installation shown in Figures 7 and 8, which comprises a number of parts identical with corresponding parts of the installation of Figures 1 to 4, the strip 4, when it leaves the rolling cylinders 5, is folded longitudinally in such a way that its cross section, after having passed through the shape indicated at b in Figure 9 is made U-shaped as shown at c.

To this end, it passes successively between shaping rollers 42 and 52. The upper rollers have projections 43 and 53 respectively of trapezoidal and rectangular shape, while grooves 44 and 54 which have corresponding shapes are formed in the lower rollers.

The strip then enters the casing 19, the top 19 (Figure 7) of which has been assumed to have been removed in Figure 8, and the side face 20 (Figure 8) of which has been assumed to have been removed in Figure 7.

In the casing 19, there is a vessel 23 containing powder and identical with that of Figures 1, 2 and 4. The powder fills the bottom of the channel formed by the U-shaped strip and the height of the powder 45 (Figure 9) is determined by the position of a lath 46 the position of which is adjustable like that of the comb 24.

The strip then passes between the rollers 47. The lower roller is smooth and a groove 48 of trapezoidal cross section is formed in the upper roller.

The cross section of the strip then takes up the shape shown at e in Figure 9, then that shown at f when it leaves the plain rollers 49. A nickel wire 29 coming from the spool 30 is then brought against the strip which is rolled to angle shape (see g Figure 9) by grooved rollers 50 and 51 which force the wire 29 into the apex of the angle. The two legs of the angle are then brought into contact with each other by causing the strip to pass between the rollers 31 which have a vertical axis.

The manufacture of the electrode is then finished off in the same manner as in the case of the installation of Figures 1 to 4.

To insulate from the outside, the addition substances which are between the faces of the folds, it is not necessary that these faces should be welded at the periphery. For example, the electrode obtained by tightening the addition substances dry within the folds can be covered with a fluid-tight sheath formed of varnish. Oxidation of the electrode is thus avoided. Again, when an iron strip is used, it can be annealed in such a way that it passes through the blue zone. In this way, as oxidation can no more occur, the varnish can be dispensed with. A fluid-tight sheath can also be used which contains substances which contribute to the production of a good deposited metal. Among these substances can be mentioned not only those which form part of the composition of the deposited welding metal, but also those, which in the case of an arc welding electrode, serve to direct the arc. The fluid-tight sheath in question can also contain substances which are electrical insulators and which prevent the formation of short circuits when the electrode comes into contact with the part to be welded at a point other than its extremity from which the arc is to spring.

The pulverised substance which is added to the strip need not necessarily be metallic. Moreover, instead of powder, substances in the form of fibres, chips, etc., can be added.

Other means could, of course, be used instead of an electro-magnet fed with alternating current for vibrating the vessel 23. The additions contained in the vessel 23 could also be agitated otherwise than by vibrating the vessel. In particular, an agitator could be arranged within the mass of additions contained in the vessel 23.

What I claim is:

1. Process of making a welding rod of desired cross section, said process comprising longitudinally folding a sheet of relatively thin sheet metal in a manner to define several longitudinal channels on one side of the sheet, filling the channels with comminuted additive material, compressing the resultant so as to reduce the apertures of the channels and compact the additive material contained in the channels, said compressing being performed in a manner to cause portions of at least two channel walls to extend across the mouths of the channels and touch, and simultaneously welding the touching wall portions together to form a sealed casing preventing access of outside air to the additive material within the casing.

2. Process of making a welding rod of desired cross section, said process comprising longitudinally folding a sheet of relatively thin metal to define several longitudinal channels with extensions on the outer walls of the outside channels, filling the channels on one side of the sheet with additive material, compressing the resultant so as to reduce the apertures of the channels and compact the additive material therein, said compressing being performed in a manner to cause the said extensions to extend across the mouths of the channels and touch, and welding the touching portions of the extensions together to form a closed casing excluding the outside atmosphere from the additive material.

3. A welding rod comprising a casing formed of relatively thin metal sheet having longitudinal channels defined by longitudinal folds in the sheet, comminuted additive material filling the channels on one side of the sheet, with portions of the walls of some of the channels extending across the mouths of the channels and welded together to seal the additive material in the channels from the atmosphere.

4. A welding rod comprising a casing formed of a sheet of relatively thin metal, at least two longitudinal channels defined by longitudinal folds in the sheet, comminuted additive material filling the channels on one side of the sheet, extensions being formed on a wall of some of the channels, said extensions being deflected across the mouths of the channels and welded together to seal the casing and prevent access of outside air to the additive material within the casing.

CAMILLO CITO.